Figure 1:
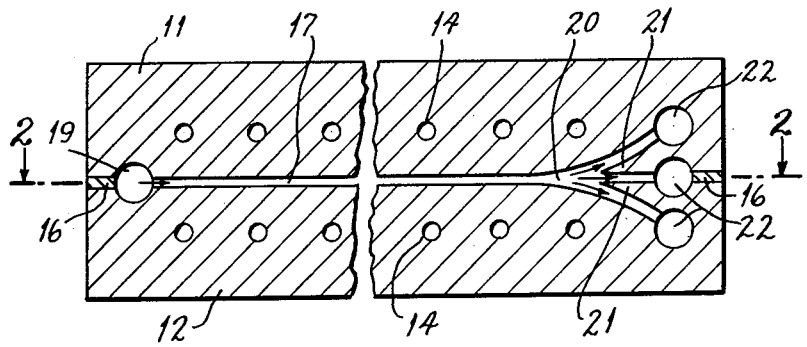

March 6, 1956  R. A. GARDNER  2,737,297
THERMAL DIFFUSION APPARATUS
Filed Oct. 23, 1952

INVENTOR.
RALPH A. GARDNER
BY
HIS ATTORNEYS

United States Patent Office 2,737,297
Patented Mar. 6, 1956

2,737,297
THERMAL DIFFUSION APPARATUS

Ralph A. Gardner, Cleveland, Ohio, assignor to The Standard Oil Company, Cleveland, Ohio, a corporation of Ohio Application October 23, 1952, Serial No. 316,445

1 Claim. (Cl. 210—52.5)

The present invention relates to improvements in apparatus and methods for separating liquid mixtures by continuous thermal diffusion.

It has been known for some time that it is possible to separate liquid mixtures into two or more dissimilar fractions by imposing a temperature gradient across a thin film of liquid mixture. For many years this was accomplished in apparatus consisting essentially of two closely spaced, parallel walls forming a narrow slit and provided at each end of the slit with a reservoir having a volume considerably in excess of the volume of the slit. By filling such an apparatus with a liquid mixture and maintaining the opposed walls at different temperatures, the liquid in one reservoir becomes enriched in one component of the liquid mixture, and the liquid in the other reservoir becomes impoverished in said component or enriched in another component.

After many hours or several days, the liquids in the two reservoirs are separately withdrawn.

The amount of liquid that can be subjected to thermal diffusion in apparatus of this type is extremely small, being measured in tens of ccs., and the time and heat energy required is so great that the technique of separating liquid mixtures by thermal diffusion remained nothing more than a laboratory curiosity for some eighty years.

It has been proposed, e. g., in Patents 2,541,069–071, to subject liquid mixtures, a term intended herein to include mixtures and solutions liquid under operating conditions, to continuous thermal diffusion by maintaining a temperature gradient across a narrow slit formed by closely spaced concentric or flat walls and continuously passing a stream of liquid mixture through the slit. It has been found that by such means the rate of separation obtainable is much improved.

The slit widths of liquid thermal diffusion columns are are extremely narrow, i. e., less than about 0.15 inch and desirably not more than about 0.06 inch. When the flow pattern in a continuous liquid thermal diffusion operation is concurrent, as described, for example, in applications Serial Nos. 271,181 and 271,183, both filed February 12, 1952, there is theoretically no limit to the minimum slit width due to the absence of endwise thermal circulation within the slit. For practical considerations, however, the minimum slit width for concurrent flow is of the order of about 0.01 inch.

Results that have been obtained in separating liquid mixtures by thermal diffusion support a conclusion that a given component in the liquid mixture tends to become more concentrated adjacent one wall of the slit or separation chamber and to become less concentrated adjacent the opposite wall. A division of the liquid in a separation chamber along lines parallel to the surfaces of the chamber therefore yields fractions of the initial liquid mixture which are dissimilar in that they contain different concentrations of one or more of the components of the mixture. There is reason to believe that the degree of separation, i. e., the degree to which the dissimilar fractions differ from one another, is considerably greater within a separation chamber than is apparent upon analysis of the dissimilar fractions actually withdrawn from the chamber. It is probably that the loss in efficiency of separation is due, in large part, to intermixing of the fractions separated within the chamber as they are being withdrawn therefrom and that this, in turn, is due to turbulence and sudden change in direction and speed of flow of the liquid withdrawn through the withdrawal ports of hitherto proposed concurrent flow apparatus.

The present invention is addressed particularly to improving the efficiency with which fractions separated by thermal diffusion within a separation chamber can be withdrawn.

One improvement with which the invention is concerned is an improved means and method for withdrawing two or more dissimilar fractions from a given end of a thermal diffusion separation chamber. This improvement comprises, in substance, an endwise extension of the separation chamber that gradually increases in width and becomes correspondingly narrower in breadth so that the cross-sectional, i. e., the product of the width and the breadth, remains substantially constant and equal to the cross-sectional area of the separation chamber. One or more dividers are provided in the section of gradually increasing width for separating the dissimilar fractions advancing through the separation chamber. For each fraction to be separated a passage is provided that communicates with the space between a given divider and one of the diverging walls or an adjacent divider.

The method of the invention essentially comprises advancing a thin continuous stream of liquid mixture through a thermal diffusion separation chamber and gradually increasing the width of the narrow stream while decreasing its breadth correspondingly to avoid changing materially the volumetric rate of advancement thereof, then dividing the widened stream into a plurality of dissimilar fractions and separately removing the divided fractions.

The method and apparatus of this invention is useful whether the thermal diffusion slit or column is arranged vertically, horizontally or inclined. If the slit is not vertical, it is usually preferable that the relatively hot wall be above the relatively cold wall in order to avoid interference with the thermal circulation due to convection.

One of the primary advantages of the invention is that it is possible to separate more than two fractions in a concurrent flow thermal diffusion method. The gradual increase in the width of the stream as it enters the withdrawal section and the corresponding decrease in the breadth thereof insure a non-turbulent flow inasmuch as the stream is not subjected to any change in velocity or to any abrupt change in direction. After the stream has become sufficiently wide, preferably at least about 0.1 inch, it is feasible to divide it into several distinct parts without causing undue turbulence and consequent remixing. Thus, for example, a stream having a breadth of nine inches and a width of 0.05 inch in the thermal diffusion separation chamber can gradually be altered, in a withdrawal section having a length of approximately twelve to eighteen inches, to increase the width to 0.15 inch and decrease the breadth to three inches while keeping the flow velocity substantially constant.

Another advantage of the invention is that it provides means for separating selectively any desired fraction or fractions obtained within the thermal diffusion slit. If the thermal diffusion slit is horizontal and the hot wall is above the cold wall, a vertical density gradient, with density decreasing from adjacent the cold wall to adjacent the hot wall, is established in the liquid. This is a stable condition for liquids that has a tendency to persist through small perturbations and is not disturbed by lateral contraction and vertical expansion of the liquid stream through the withdrawal section. Thus, for example, where a liquid mixture of six components is subjected to thermal diffusion and is resolved, within the slit, into a first fraction nearest the hot wall containing one component in maximum concentration, a second fraction next to the first fraction containing a second component in maximum concentration, and so on to a sixth fraction nearest the cold wall containing the sixth component in maximum concentration, it is possible, by means of properly spaced dividers in the vertically expanded stream, selectively to remove any desired fraction or combination thereof, e. g., the second fraction, the second and fifth fractions, and so on.

Figure 2:
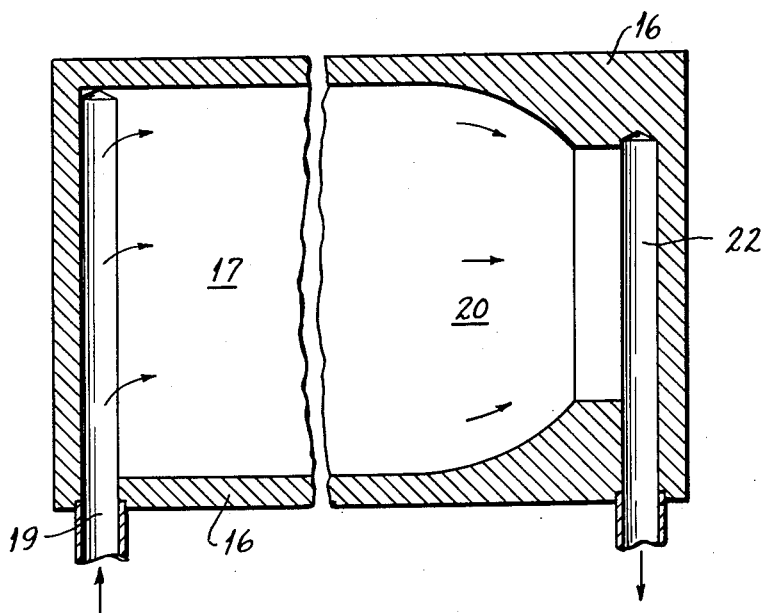

These and other advantages, as well as the utility of the invention, will become more apparent from the following detailed description made with reference to the accompanying drawing, wherein:

Figure 1 is a view in cross-section of a thermal diffusion apparatus constructed in accordance with the invention; and Figure 2 is a view in cross-section of the apparatus shown in Figure 1 but taken along section line 2—2 of Figure 1.

The opposed walls of the thermal diffusion apparatus are schematically indicated at 11 and 12. The walls may be provided with any suitable heating or cooling means such as the coils illustrated schematically at 14 and may suitably be spaced apart by means of a gasket 16, or the like, in order to give the slit or thermal diffusion separation chamber 17 the desired slit width. An inlet port 19 is provided, if desired, at one end of the apparatus and a withdrawal section including an extension 20 of the chamber 17, one or more dividers 21, and two or more passages 22 are provided at an end remote from the inlet port 19.

In operation, the liquid mixture to be subjected to thermal diffusion is introduced by way of inlet port 19 and advanced through the separation chamber or slit 17. During the advancement of the liquid mixture through the slit 17 the liquid adjacent one wall becomes enriched in one given component and the liquid adjacent the opposite wall becomes correspondingly impoverished in said component or enriched in another component. The mixture, which has thus been separated into dissimilar fractions, then enters the extension 20 of the slit wherein the opposed walls diverge and the breadth of the slit becomes smaller at rates that insure a minimum of change in flow velocity and a minimum rate of change in direction of flow, and therefore minimum turbulence. By the time the stream reaches the dividers 21, its width is sufficient to divide the stream into two or more fractions without creating any appreciable turbulence. The separated fractions then flow either between a divider 21 and an adjacent divergent wall surface, or between two adjacent dividers, as shown, for example, in Figure 1, to individual outlet ports or passageways 22 by means of which the separated fractions are removed from the apparatus.

It is to be understood, of course, that means such as valves may be provided to withdraw separate fractions at unequal rates and to recycle any fraction, if desired, to the inlet port. Thus, for example, if the fractions removed by way of the uppermost and lowermost passageways 22, shown in Figure 1 of the drawing, are removed at equal rates, it may well be expected that the fraction withdrawn by the intermediate withdrawal port 22 would closely resemble the initial mixture and could advantageously be recycled to the separation chamber 17 by way of inlet port 19.

It is to be understood that many variations and modifications of the apparatus and method of this invention will readily become apparent to those skilled in the art upon reading this description. All such variations and modifications are intended to be included within the scope of the invention as defined in the appended claim.

I claim:

Liquid thermal diffusion apparatus comprising two substantially parallel walls, the opposed faces of which are smooth and spaced apart less than about 0.15 inch to form a separation chamber of a given cross-sectional area, of substantially uniform and narrow width and of a given breadth; means for relatively heating and cooling said parallel walls to impose a temperature gradient across said separation chamber, an inlet communicating with the separation chamber for introducing liquid separable by thermal diffusion into dissimilar fractions; and at least one product withdrawal section at an end of the separation chamber remote from the inlet, said withdrawal section comprising an endwise extension of the separation chamber gradually increasing in width and narrowing in breadth and of substantially constant cross-sectional area substantially equal to the cross-sectional area of the separation chamber, at least one divider in said withdrawal section for separating dissimilar fractions accumulated adjacent opposed walls in the separation chamber and flowing concurrently along said walls into the withdrawal section, and means forming a passage communicating with the space between said divider and one of the diverging walls in the withdrawal section for withdrawing the fraction entering said space.

References Cited in the file of this patent

UNITED STATES PATENTS

| Number | Name | Date |
|---|---|---|
| 631,371 | Kithcart et al. | Aug. 22, 1899 |
| 1,119,882 | Ryder | Dec. 8, 1914 |
| 1,864,911 | Jodeck | June 28, 1932 |
| 2,521,112 | Beams | Sept. 5, 1950 |
| 2,541,071 | Jones et al. | Feb. 13, 1951 |